(12) United States Patent
Zeigler

(10) Patent No.: US 7,530,826 B2
(45) Date of Patent: May 12, 2009

(54) SEALED CAVITY WITH VENT HOLE METHOD AND APPARATUS FOR USE IN SENSOR MODULES

(75) Inventor: Gregory J. Zeigler, Freeport, IL (US)

(73) Assignee: Honeywell International Inc., Morristown, NJ (US)

( * ) Notice: Subject to any disclaimer, the term of this patent is extended or adjusted under 35 U.S.C. 154(b) by 74 days.

(21) Appl. No.: 11/522,201

(22) Filed: Sep. 15, 2006

(65) Prior Publication Data

US 2008/0070433 A1 Mar. 20, 2008

(51) Int. Cl.
*H01R 4/60* (2006.01)
(52) U.S. Cl. .............................. 439/206; 73/706; 29/877
(58) Field of Classification Search ................ 439/206, 439/913; 73/706, 727, 756, 715; 361/752; 29/877, 883

See application file for complete search history.

(56) References Cited

U.S. PATENT DOCUMENTS

| | | | | |
|---|---|---|---|---|
| 3,624,585 | A * | 11/1971 | Kokalas et al. | 439/195 |
| 4,452,202 | A | 6/1984 | Meyer | 123/494 |
| 4,796,464 | A * | 1/1989 | Miller | 73/115 |
| 4,888,992 | A | 12/1989 | Mathias et al. | 73/727 |
| 4,982,351 | A * | 1/1991 | Kawate et al. | 702/104 |
| 5,684,253 | A | 11/1997 | Bonne et al. | 73/706 |
| 5,762,481 | A * | 6/1998 | Oi | 417/423.3 |
| 6,297,448 | B1 * | 10/2001 | Hara | 174/559 |
| 6,558,180 | B2 * | 5/2003 | Nishimoto | 439/282 |
| 6,609,427 | B1 * | 8/2003 | Westfield et al. | 73/753 |
| 6,945,120 | B1 * | 9/2005 | Marcus et al. | 73/756 |
| 6,959,607 | B2 | 11/2005 | Wilda | 73/716 |
| 7,010,972 | B2 * | 3/2006 | Kozawa et al. | 73/204.22 |

(Continued)

FOREIGN PATENT DOCUMENTS

EP 1584910 A1 10/2005

(Continued)

OTHER PUBLICATIONS

*Integrated Silicon Pressure Sensor for Manifold Absolute Pressure, Altimeter or Barometer Applications On-Chip Signal Conditioned, Temperature Compensated and Calibrated*; Motorola Semiconductor Technical Data.

(Continued)

*Primary Examiner*—Neil Abrams
(74) *Attorney, Agent, or Firm*—Kermit D. Lopez; Luis M. Ortiz

(57) ABSTRACT

A method and apparatus for creating a sealed cavity includes a housing assembly (100) incorporating a molded connector (110) with an interior portion formed into a cavity (170) and a vent hole (160) that communicates with the cavity (170). The vent hole (160) permits escape of gas generated by solidification of sealant (410) used to attach lid (410) to housing lid seat (120). The vent hole (160) further prevents contaminants from reaching the cavity interior until the final connector seal is applied. The vent hole (160) can be interfaced with a final applied mating sealed connector which utilizes the mating connector seal to provide the final cavity seal. The molded connector (110) can then be adapted with a sensor module which circumvents the need for sealing the small vent hole (160) using additional processes.

20 Claims, 20 Drawing Sheets

U.S. PATENT DOCUMENTS 7,159,464 B2 * 1/2007 Tohyama et al. .............. 73/706
7,197,937 B2 * 4/2007 Amore et al. ................. 73/715
2002/0023500 A1 2/2002 Chikuan et al.

FOREIGN PATENT DOCUMENTS

JP 55-103438 * 8/1980
JP 11148880 6/1999

OTHER PUBLICATIONS

*Pressure Sensors*, Toyota Motor Sales, U.S.A.
*Microsystems for Automotive Industry*; S. Krueger, R. Muller-Fiedler, S. Finkbeiner, H. Peter Trah; MST News.

* cited by examiner

SEALED CAVITY WITH VENT HOLE METHOD AND APPARATUS FOR USE IN SENSOR MODULES

TECHNICAL FIELD

Embodiments are generally related to sensor modules. Embodiments are also related to methods for creating a sealed cavity for sensor modules. Embodiments are additionally related to seal vent holes used in sensing devices.

BACKGROUND OF THE INVENTION

Originating from the integrated circuit (IC) industry, the field of micro machined sensors and actuators, often referred to as "MEMS" (Micro Electro Mechanical Systems), has grown rapidly and attracted a great deal of interest in recent years. Micromachining and microfabrication advances have allowed for the miniaturization of many types of sensors and actuators. Micro sensor packaging techniques and components, for example, should protect the micro system from its operating environment, while, somewhat in contradiction, enabling interaction with that environment in order to measure or affect the desired physical or chemical parameters.

A number of MEMS-based sensing devices are utilized in various sensor applications. For example, a silicon-based manifold absolute pressure (MAP) sensor can provide an inferred value of air-to-fuel ratio by measuring intake manifold pressure data. Similarly, absolute pressure sensors are required in many applications, including industrial process control, environmental monitoring, and biomedical systems.

Elevated temperature curing of liquid adhesives used to form a sealed cavity causes air expansion within such a cavity, which in turn causes bubbles or leak paths to form. A small vent hole is typically used to allow expanding gas to escape while the liquid seal solidifies. These vent holes assure pressure equalization and minimize undesirable problems, such as primary seal blowout due to excessive pressure. In situations where pressure or a vacuum is generated in the cavity, it is preferable to locate the small vent hole in a location where it can be sealed during a later process.

A vented lid allows the atmosphere inside the sensor to equalize with the outside atmosphere. This allows the equilibrium necessary to maintain a proper atmospheric reference for gauge pressure measurement. In cases where the local environment may include splashing water, oil mist, dust, and other contaminants, the vent must be protected from exposure to these elements. The small vent hole must then also be sealed. If a liquid sealant is used to seal the small vent hole in the lid, similar challenges of expanding or contracting gas from the cavity may necessitate deliberate controls or rework to complete this seal.

In an effort to address the foregoing difficulties, a small vent hole can be placed within the confines of a molded connector, which when interfaced with the final applied mating sealed connector, utilizes the mating connector seal to provide the final cavity seal, and circumvents the need for sealing the small vent hole with additional processes. It is believed that the implementation of such a method as disclosed in greater detail herein can prevent contaminants from reaching the cavity interior.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for improved sensor modules.

It is another aspect of the present invention to provide for a method for creating a sealed cavity for use in gas sensor modules, absolute differential pressure sensors and/or manifold absolute pressure sensors.

It is another aspect of the present invention to provide for a seal vent hole for use in sensor modules and sensor devices.

The aforementioned aspects and other objectives and advantages can now be achieved as described herein. A method and apparatus for creating a sealed cavity is described, which includes the use of a molded connector with an interior portion formed into a cavity and a vent hole that communicates with the cavity. The vent hole can be interfaced with a final applied mating sealed connector, which utilizes the mating connector seal to provide the final cavity seal. The vent hole further prevents contaminants from reaching the cavity interior until the final connector seal is applied. The molded connector can then be adapted with a sensor module which circumvents the need for sealing the small vent hole using additional processes. The sealed cavity is hermetically sealed to provide an airtight and watertight cavity.

The small vent hole allows expanding gas to escape while the liquid seal solidifies. The vent hole seal device can be formed of a material that undergoes phase or dimensional change when subjected to a high temperature and/or pressure. The dimensions of the vent hole seal device can be controlled to vary the ambient conditions at which the vent hole seal device allows pressure in the cavity to be vented.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

The methodology and devices described herein can be adapted for use with a pressure sensor for sensing the pressure of a highly corrosive media, such as automobile exhaust gases, vacuum pressure within an automobile gas manifold, and the like. In pressure and gas sensor modules, pressure can be measured by monitoring a diaphragm, which is subjected to a test pressure on one side, and a specified reference pressure on the other side. The sensor may be sealed for use as an absolute pressure sensor by using planar glass. Such a pressure sensor can be then utilized for the detection of barometric pressure changes. Sealing the pressure sensor within a cavity protects it from the environment. A small vent hole allows an expanding gas to escape while the liquid seal solidifies. The vent hole is small enough to prevent contaminants from reaching the cavity interior until the final connector seal is applied, but is not prone to being inadvertently flashed over, sealed, or plugged prior to the solidification of the primary cavity seal.

Figure 1:
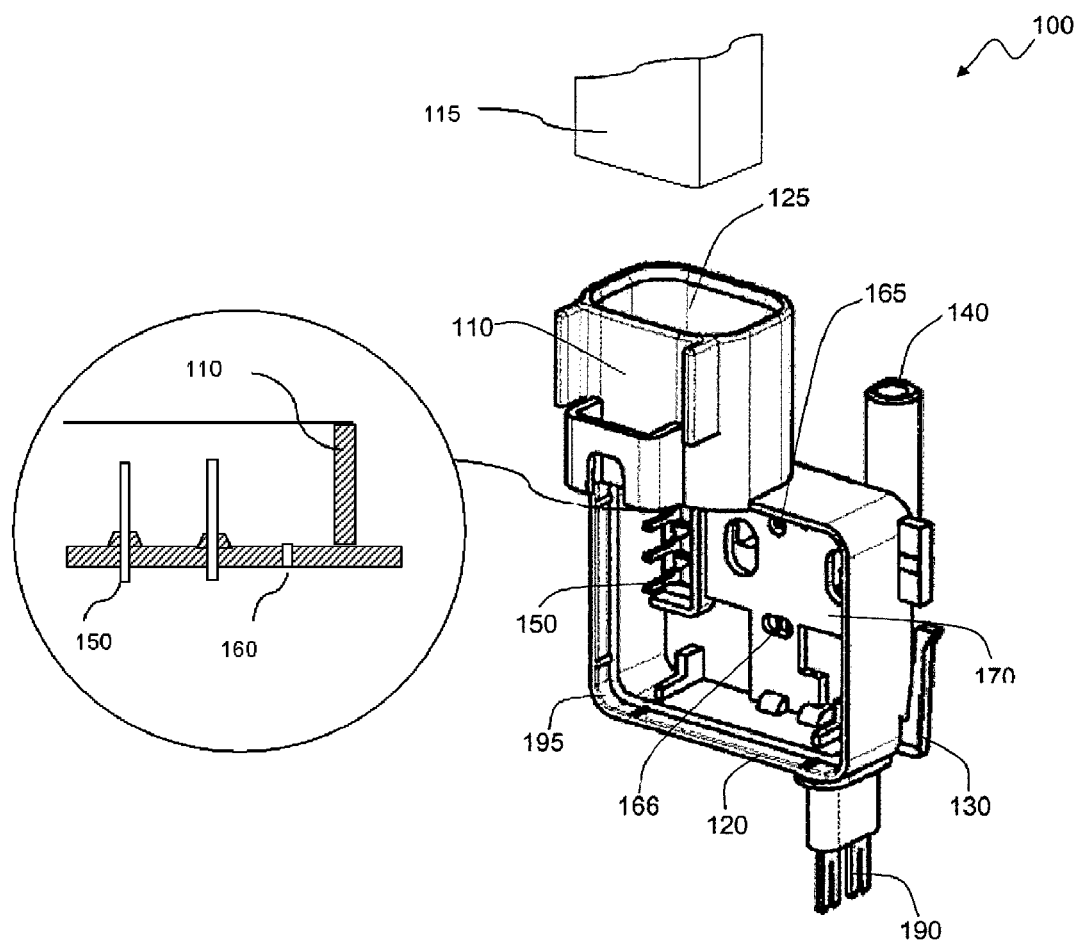
FIG. 1 illustrates a pictorial view of a housing assembly incorporating a molded connector for creating a sealed cavity, in accordance with a preferred embodiment.

Referring to FIG. 1, a pictorial view of a housing assembly 100 incorporating a molded connector for creating a sealed cavity 170 is illustrated, in accordance with a preferred embodiment. As depicted in FIG. 1, a molded connector 110 includes an interior portion formed into a cavity 170. The molded connector 110 further includes a vent hole 160 that passes through the connector 110 into cavity 170. The vent hole 160 can communicate with the cavity 170. A snap tab tooling can be inserted within the element 130. The housing assembly 100 further includes a power plug 190. Parting lines, scratches, flash or flaws must not be permitted on the lid seating surfaces 120. One or more encapsulated electric terminals 150 can be utilized to provide an airtight electrical terminal for use in conjunction with hermetically sealed devices where leakage into or from such devices, by way of the terminals 150, is effectively precluded. Final mating connector 115 communicates with the molded connector 110 by being inserted into cavity 125. Once the final mating connector 115 is inserted to the molded connector 110, a hermetically sealed cavity is created resulting in an airtight and watertight cavity.

For hermetically sealed electric terminals 150 as shown to function safely and effectively for its intended purpose, the terminals 150 are preferably configured so that their conductor pins are electrically insulated from and hermetically sealed to the body 195 through which they pass. An optimum air path can be established and thereafter maintained between adjacent portions of the pins and opposite sides of the body 195. The pressure to be measured can be taken through the pressure port 140 to the sealed cavity. No parting lines are permitted on the exterior of the pressure port 140 and the feature 166 provides for locating terminals 190 during molding.

Figure 2:
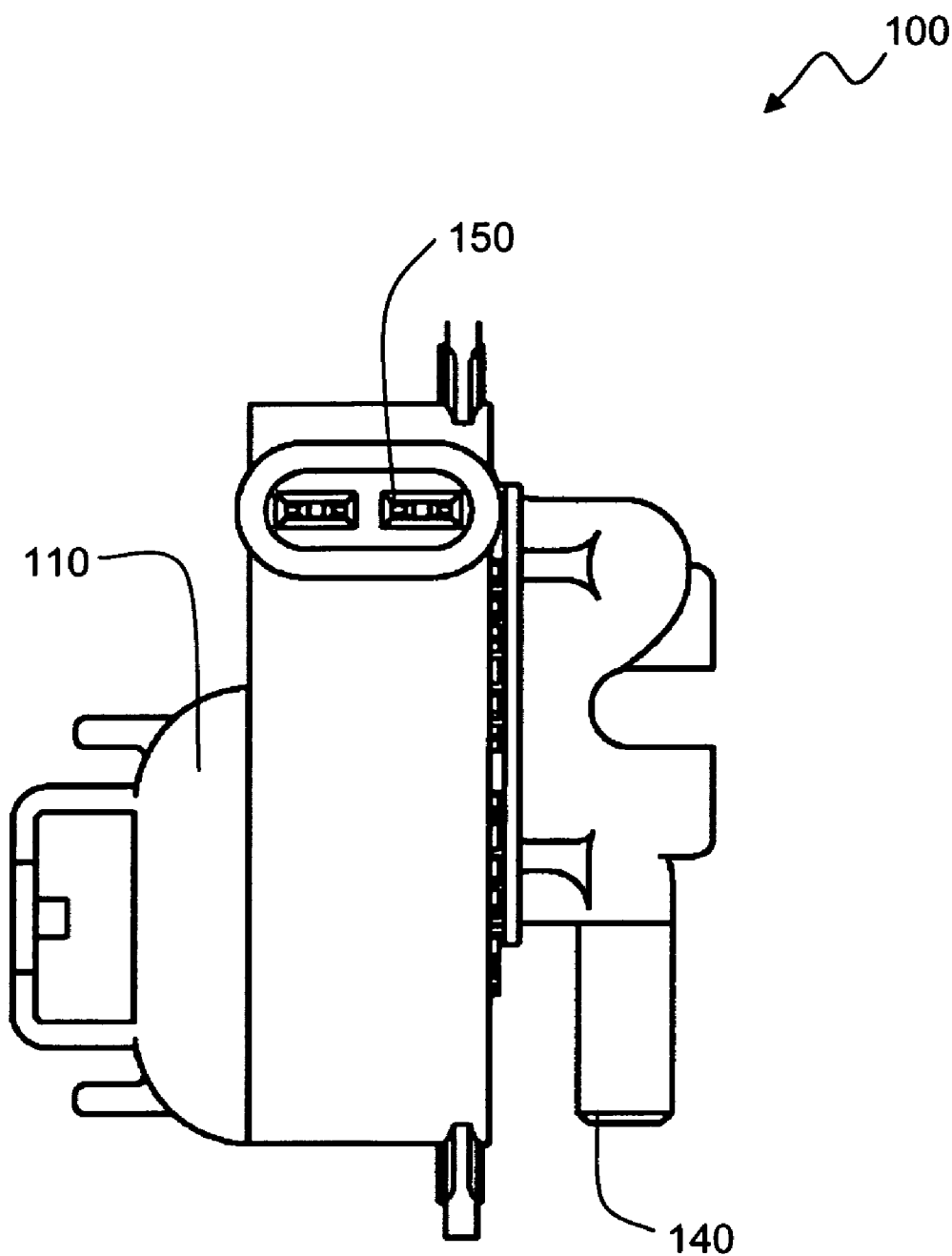
FIG. 2 illustrates a side view of a housing assembly incorporating a molded connector for creating a sealed cavity, in accordance with a preferred embodiment.

Referring to FIG. 2, a side view of a housing assembly 100 incorporating a molded connector for creating a sealed cavity is illustrated, in accordance with a preferred embodiment. Note that in FIGS. 1-10, identical or similar parts or elements are generally indicated by identical reference numerals. As indicated in FIG. 2, the molded connector 110 includes terminals 150 and a pressure port 140. Terminals 150 can be used for joining electrical circuits together.

Figure 3:
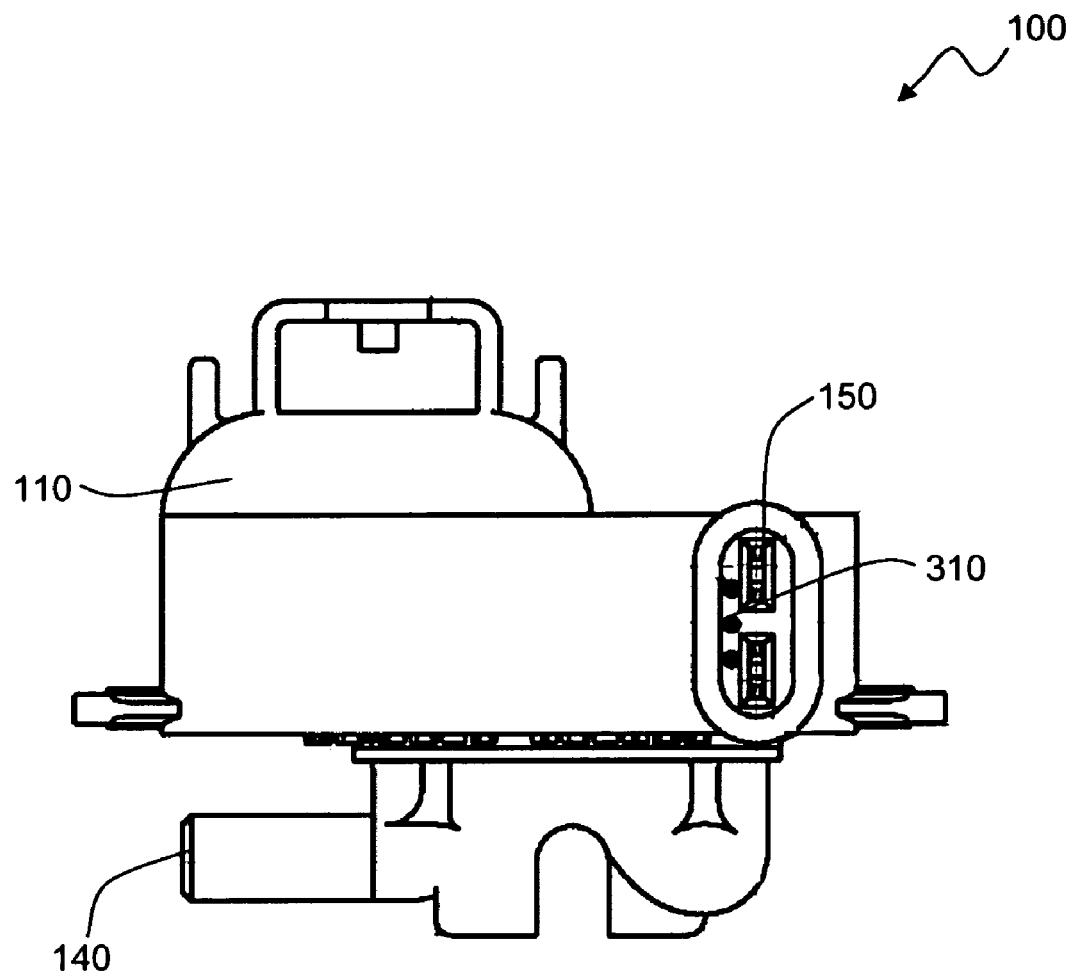
FIG. 3 illustrates another side view of a housing assembly incorporating a molded connector for creating a sealed cavity, in accordance with a preferred embodiment.

Referring to FIG. 3, another side view of the housing assembly 100 incorporating a molded connector for creating a sealed cavity is illustrated, in accordance with a preferred embodiment. As indicated in FIG. 3, the terminals 150 include pick outs 310. The FIG. 3 illustration also depicts molded connector 110 and a pressure port 140 which are described above with respect to FIG. 1.

Figure 4:
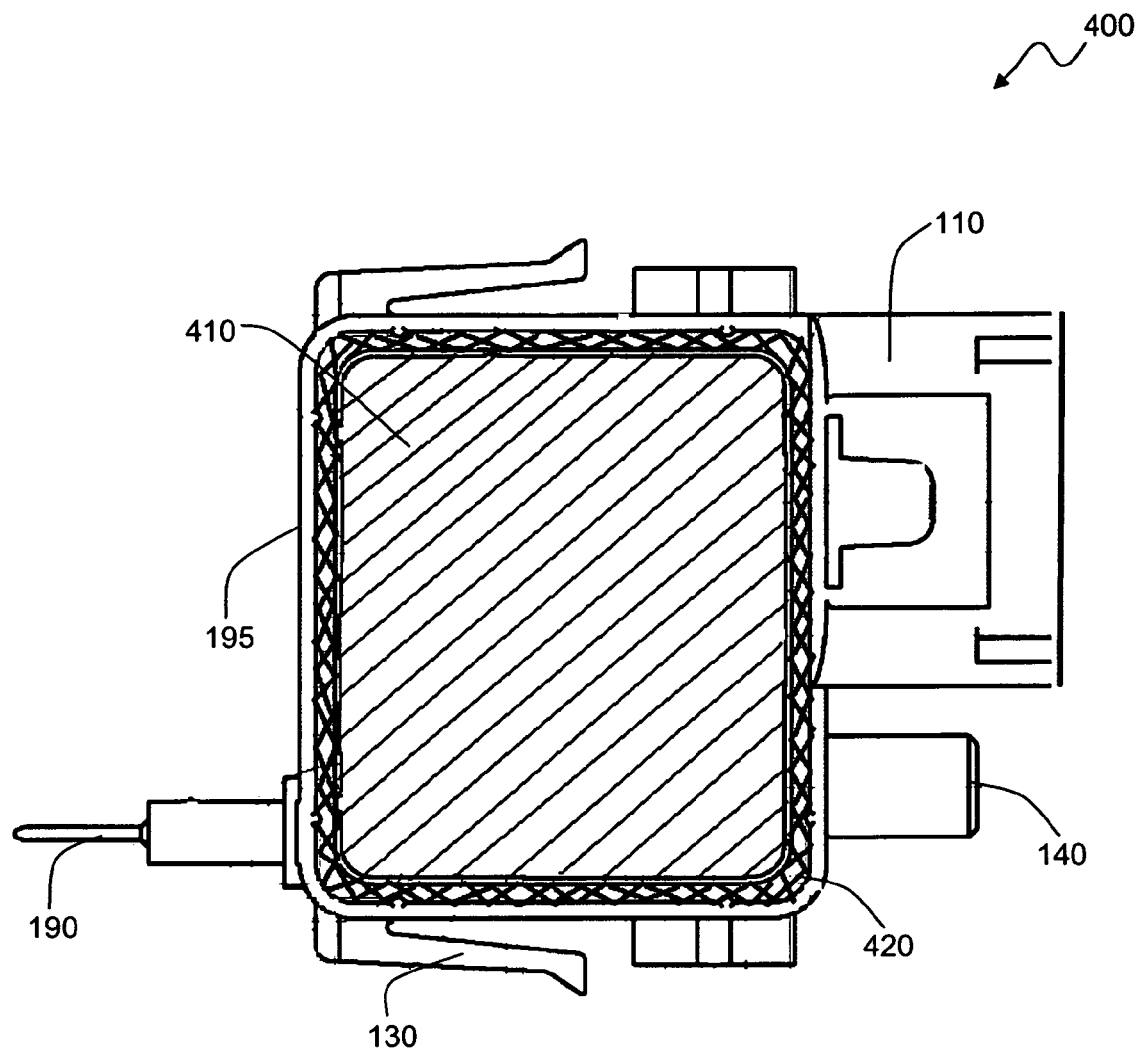
FIG. 4 illustrates a top view of a completed sensor assembly including a molded connector and sealed cavity, in accordance with a preferred embodiment.

Referring to FIG. 4 a top view of a completed sensor assembly 400 including a molded connector and sealed cavity is illustrated, in accordance with a preferred embodiment. Again, as indicated earlier, identical parts of elements depicted in FIGS. 1-10 are generally indicated by identical reference numerals. The liquid sealant 420 seals the gap between the housing 100 and the lid 410. Sealant 420 is self leveling and resistant to environmental exposure after curing. The lid 410 is placed against seating surface 120; liquid seal 420 is dispensed and cured at elevated temperature, while vent hole 160 as shown in FIG. 1 permits pressure equalization until seal 420 is solidified without bubbles or leak paths. Cured seal 420 functions as a mechanical seal that serves to join two objects and to prevent leakage between the two objects. A sealed sensor assembly is only necessary in areas where the surrounding atmosphere contains gases or particles which may be harmful to the electronics inside the housing 100.

Figure 5:
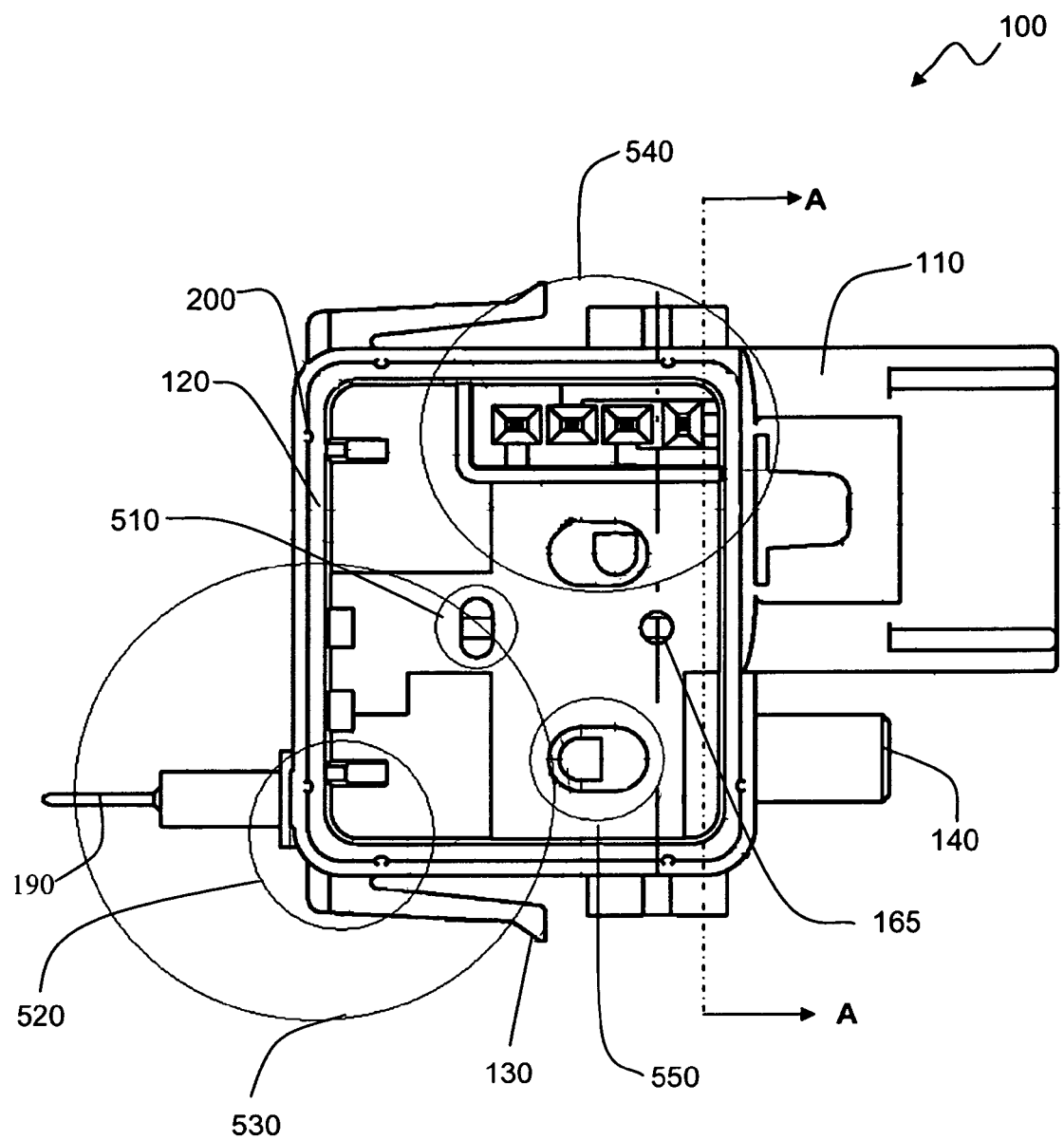
FIG. 5 illustrates a top view of a housing assembly incorporating a molded connector for creating a sealed cavity, in accordance with a preferred embodiment.

Referring to FIG. 5, a top view of a housing assembly 100 incorporating a molded connector for creating a sealed cavity is illustrated, in accordance with a preferred embodiment. Again, as indicated earlier, identical parts of elements depicted in FIGS. 1-10 are generally indicated by identical reference numerals. As indicated in FIG. 5, a small vent hole 160 is used to allow an expanding gas to escape while the liquid seal 420 as shown in FIG. 4 solidifies. The small vent hole 160 must then also be sealed. The small vent hole 160 is preferably placed within the confines of a molded connector 110, which when interfaced with the final applied mating sealed connector, utilizes the mating connector seal to provide the final cavity seal, and circumvents the need for sealing the small vent hole 160 with additional processes. The curved portions 510-550 depicted in FIG. 5 include power plug 190, lid seating surface 120, interference tabs 200 and terminals 150.

Figure 5A:
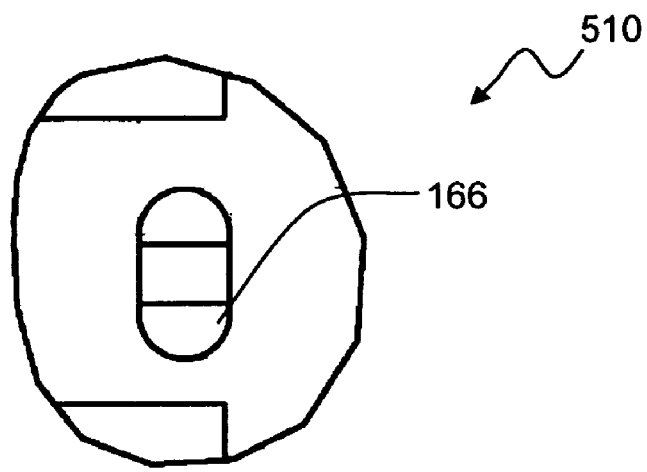
FIG. 5A illustrates a detailed view of a rounded portion of FIG. 5 showing a cavity, in accordance with a preferred embodiment.

Referring to FIG. 5A, a detailed view of a curved portion 510 of the housing assembly 100 is illustrated, in accordance with a preferred embodiment. As indicated in FIG. 5A, the feature 166 provides for locating terminals 190 during molding.

Figure 5B:
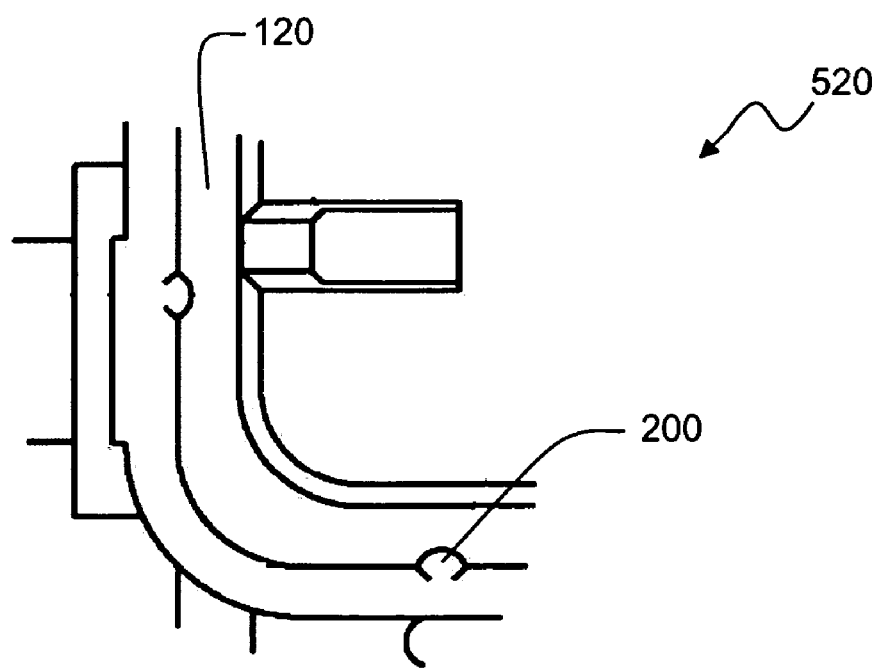
FIG. 5B illustrates a detailed view of a rounded portion of FIG. 5 showing a sealing surface, in accordance with a preferred embodiment.

Referring to FIG. 5B, a detailed view of a curved portion 520 of the housing assembly 100 is illustrated showing a lid seating surface 120, in accordance with a preferred embodiment. As depicted in FIG. 5B, parting lines must not be permitted on seating surfaces 120 because the liquid sealant 420 may seep into cavity 170 if too great a gap exists between seating surface 120 and lid 410.

Figure 5C:
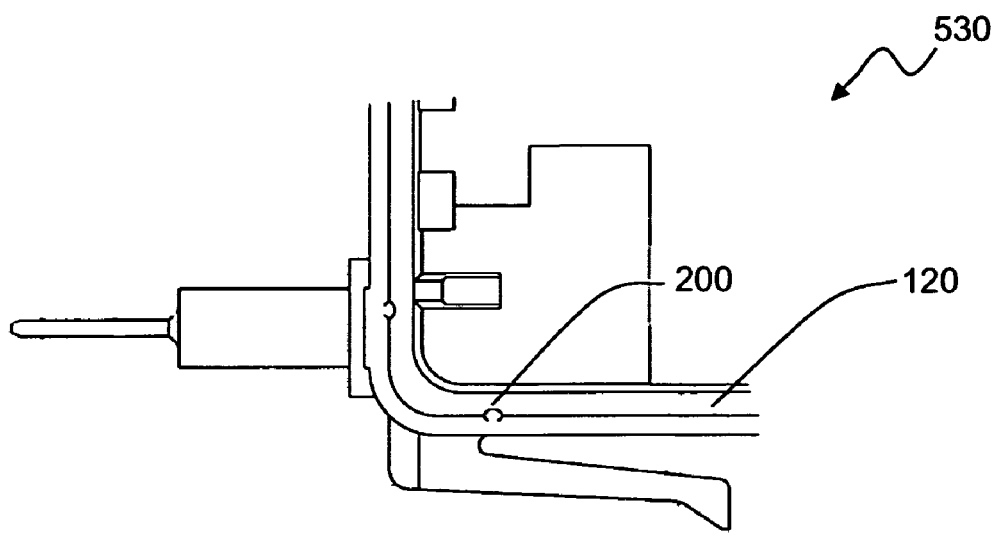
FIG. 5C illustrates an exploded perspective view of a rounded portion of FIG. 5 showing a sealing surface, in accordance with a preferred embodiment.

Referring to FIG. 5C, an exploded perspective view of a curved portion 530 of the housing assembly 100 is illustrated, in accordance with a preferred embodiment. The interference tabs 200 descend to lid seating surface 120, and hold lid 410 in position during dispensing liquid sealant 420 and curing sealant 420.

Figure 5D:
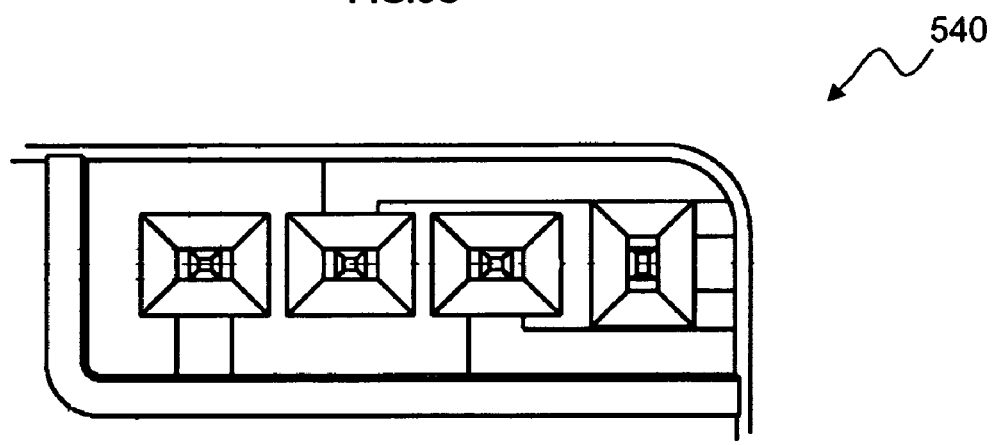
FIG. 5D illustrates an exploded perspective view of a rounded portion of FIG. 5 showing terminals, in accordance with a preferred embodiment.

Referring to FIG. 5D, an exploded perspective view of a curved portion 540 of the housing assembly 100 containing terminals 150 is illustrated, in accordance with a preferred embodiment.

Figure 5E:
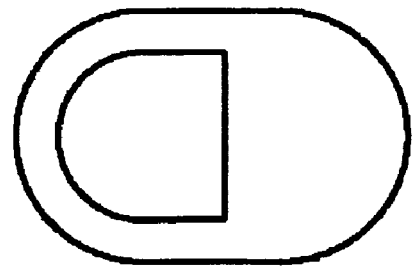
FIG. 5E illustrates an exploded perspective view of a rounded portion of FIG. 5, in accordance with a preferred embodiment.

Referring to FIG. 5E, an exploded perspective view of a curved portion 550 of the housing assembly 100 is illustrated, in accordance with a preferred embodiment. The cavity 170 is generally precluded from adding layers over the active devices on the wafer surface. The materials and seals used must be leak-free, impermeable and not sources of significant out-gassing, both during assembly and over the expected operating lifetime.

Figure 5F:
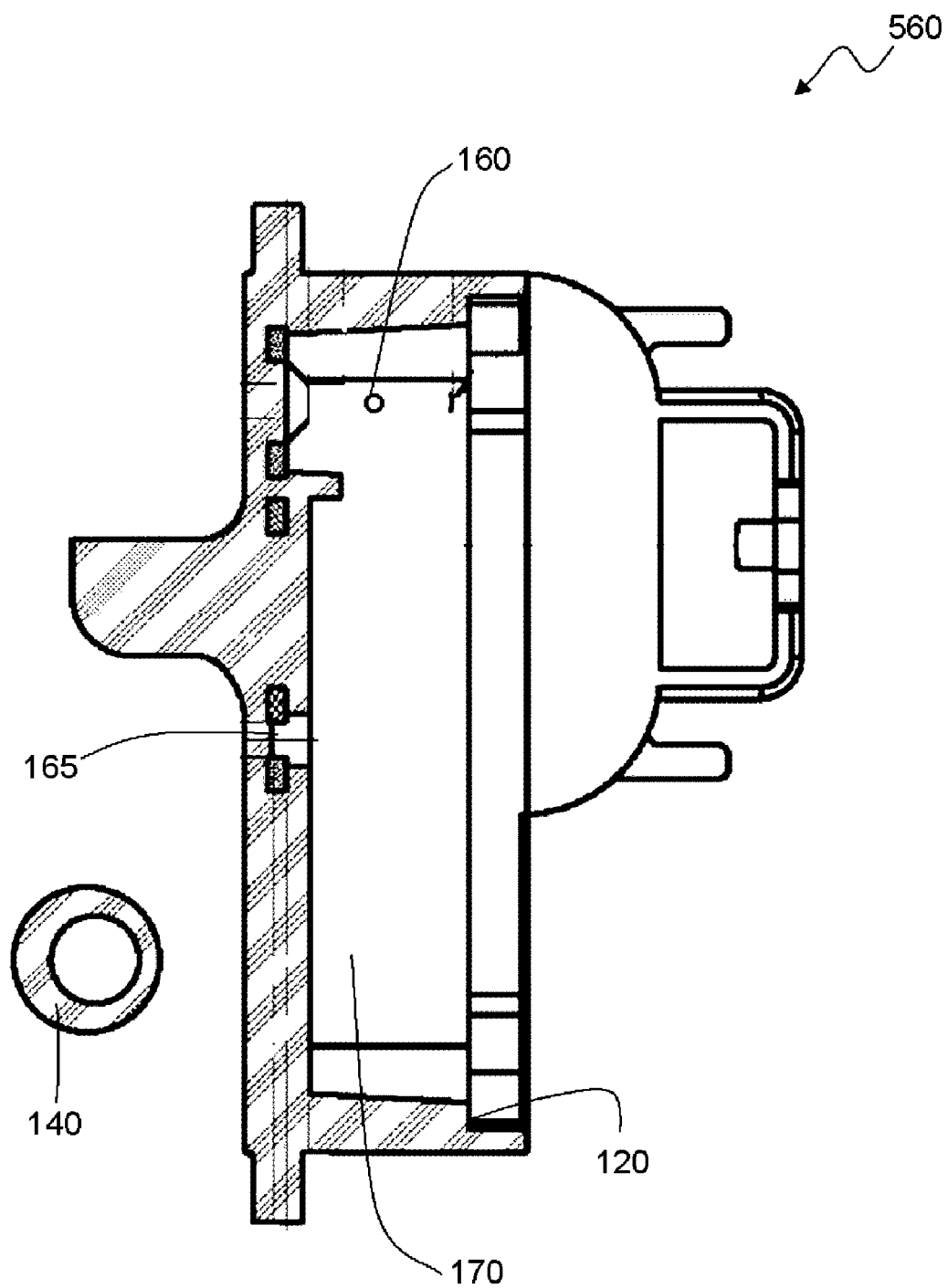
FIG. 5F illustrates a sectional view A-A of a housing assembly depicted in FIG. 5 for creating a sealed cavity, in accordance with a preferred embodiment.

Referring to FIG. 5F, a sectional view A-A of a molded connector 560 for creating a sealed cavity is illustrated, in accordance with a preferred embodiment. As depicted in FIG. 5F, the terminals 150 must not be contaminated with any substance that inhibits soldering. The FIG. 5F illustration also depicts the vent hole 160 and the pressure port 140, which are described above with respect to FIG. 1.

Figure 6:
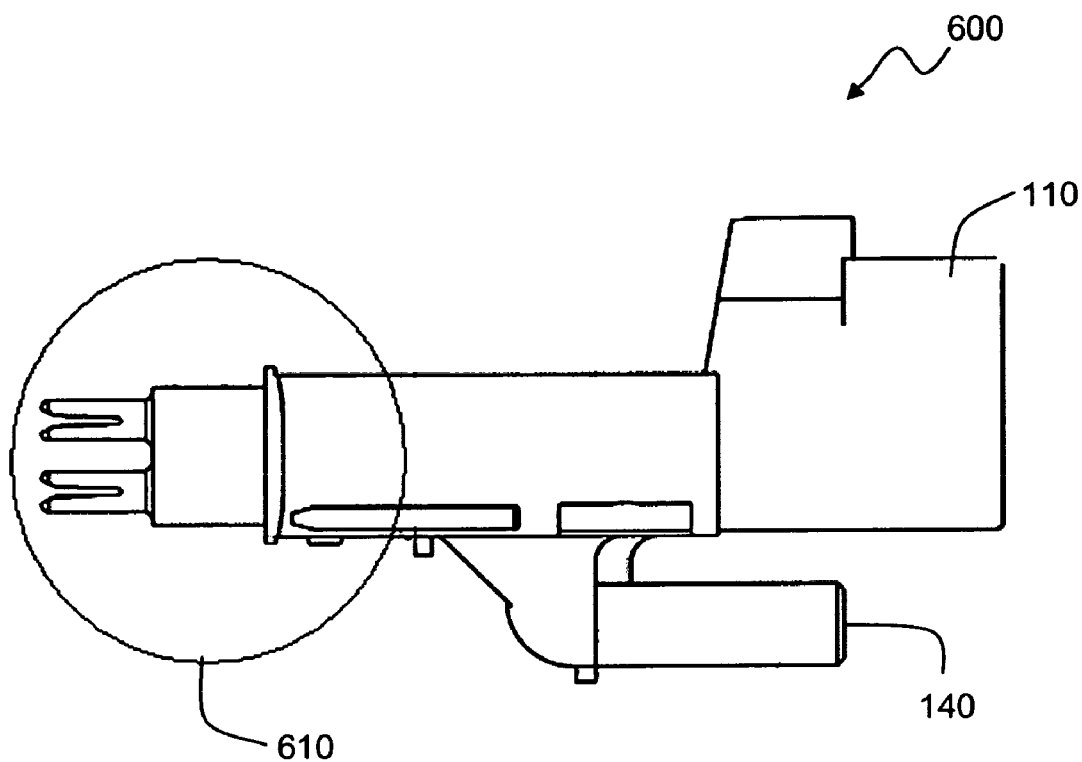
FIG. 6 illustrates a portion of a sealing surface of a housing assembly incorporating a molded connector for creating a sealed cavity, in accordance with a preferred embodiment.

Referring to FIG. 6, a portion of a sealing surface of a housing assembly 600 for creating a sealed cavity is illustrated, in accordance with a preferred embodiment. Again, as indicated earlier, identical parts of elements depicted in FIGS. 1-10 are generally indicated by identical reference numerals. The power plug 190 generally includes two terminals EVR (+) and EVR (−).

Figure 6A:
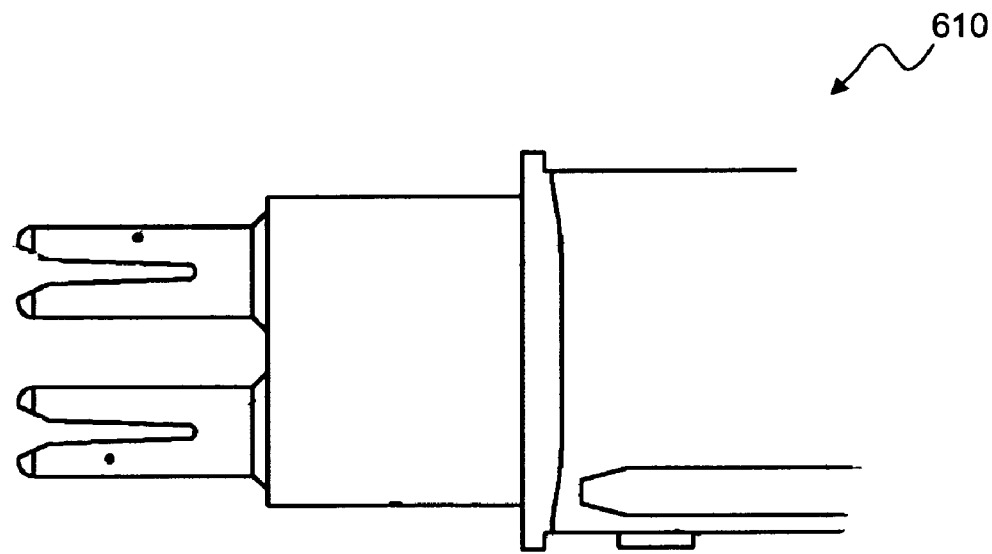
FIG. 6A illustrates an exploded perspective view of a curved portion of FIG. 6 of a housing assembly incorporating a molded connector for creating a sealed cavity, in accordance with a preferred embodiment.

Referring to FIG. 6A, an exploded perspective view of a curved portion 610 of a housing assembly 600 for creating a sealed cavity is illustrated, in accordance with a preferred embodiment.

Figure 7:
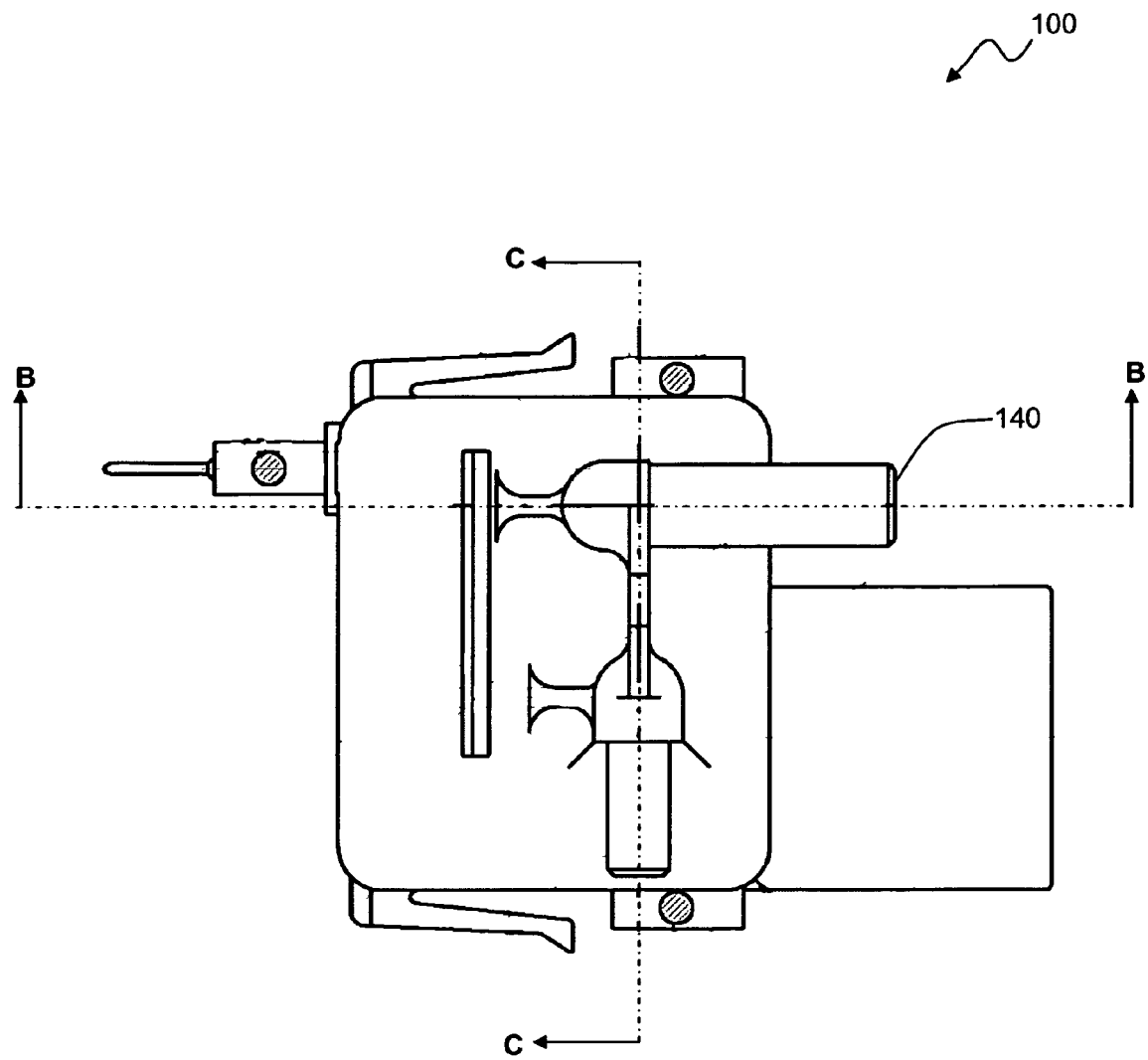
FIG. 7 illustrates a bottom view of a housing assembly of the molded connector for creating a sealed cavity, in accordance with a preferred embodiment.

Referring to FIG. 7, a bottom view of a housing assembly 100 of a molded connector for creating a sealed cavity is illustrated, in accordance with a preferred embodiment. Note that in FIGS. 1-10, identical or similar parts or elements are generally indicated by identical reference numerals. As mentioned earlier, the parting lines must not be permitted on the external surface of pressure port 140 in order to ensure proper sealing.

Figure 7A:
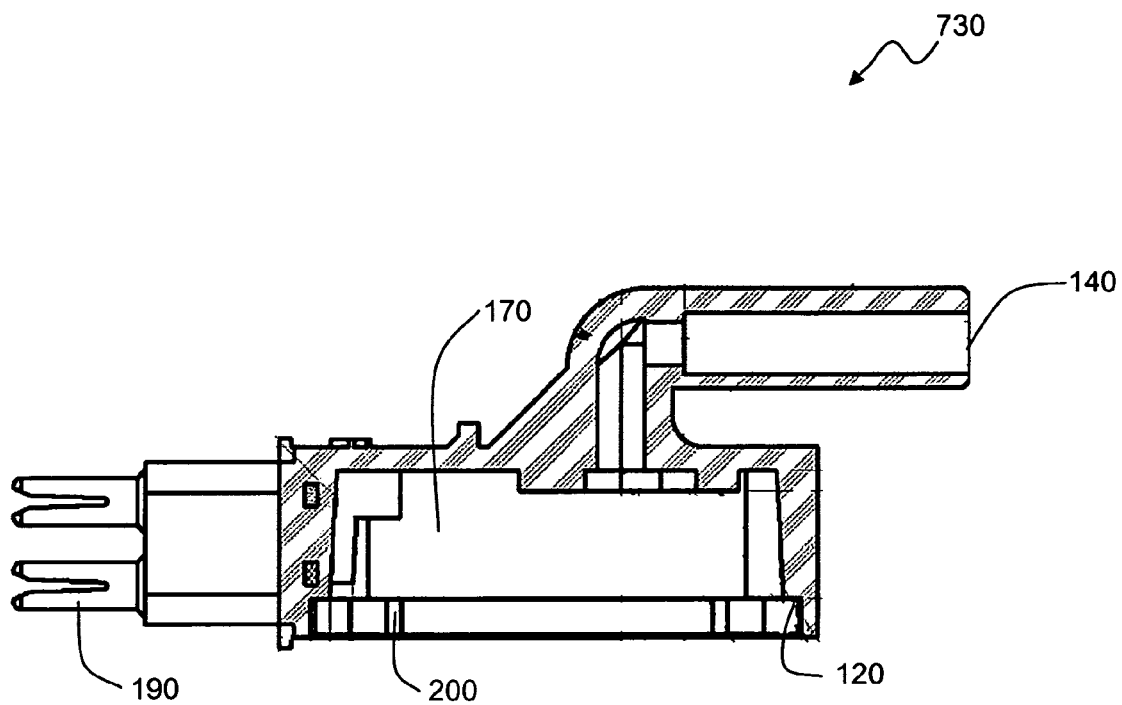
FIG. 7A illustrates a sectional view B-B of the molded connector depicted in FIG. 7 for creating a sealed cavity, in accordance with a preferred embodiment.

Referring to FIG. 7A, a sectional view B-B of a housing assembly 730 for creating a sealed cavity is illustrated, in accordance with a preferred embodiment. Again, as indicated earlier, identical parts of elements depicted in FIGS. 1-10 are generally indicated by identical reference numerals. Thus, the FIG. 7A illustration also depicts the power plug 190, lid seating surface 120, and a pressure port 140 which are described above with respect to FIG. 1.

Figure 7B:
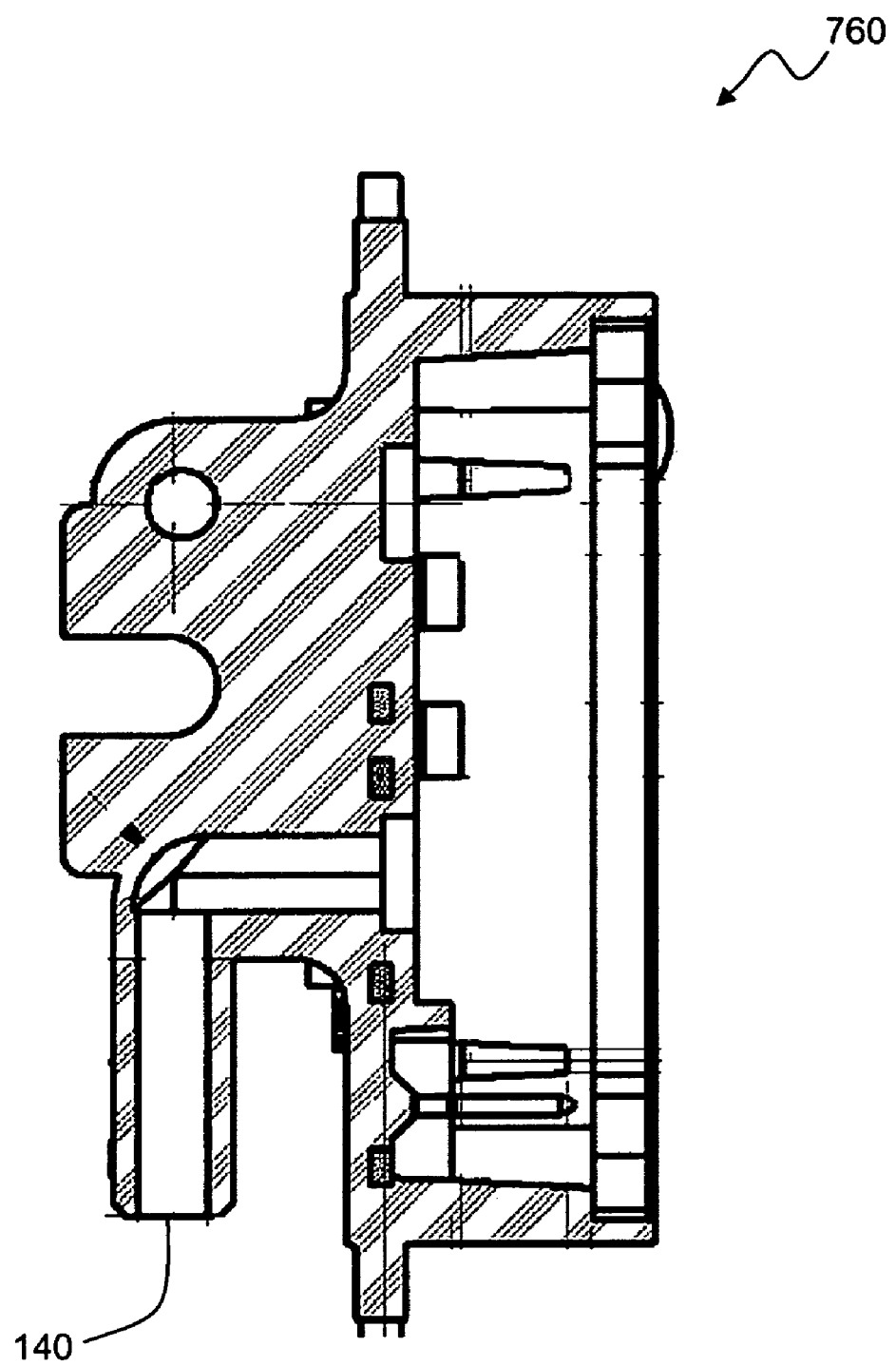
FIG. 7B illustrates a sectional view C-C of the molded connector depicted in FIG. 7 for creating a sealed cavity, in accordance with a preferred embodiment.

Referring to FIG. 7B, a sectional view C-C of a housing assembly 760 for creating a sealed cavity is illustrated, in accordance with a preferred embodiment. The FIG. 7B illustration also depicts the pressure port 140, which is described above with respect to FIG. 1.

Figure 8:
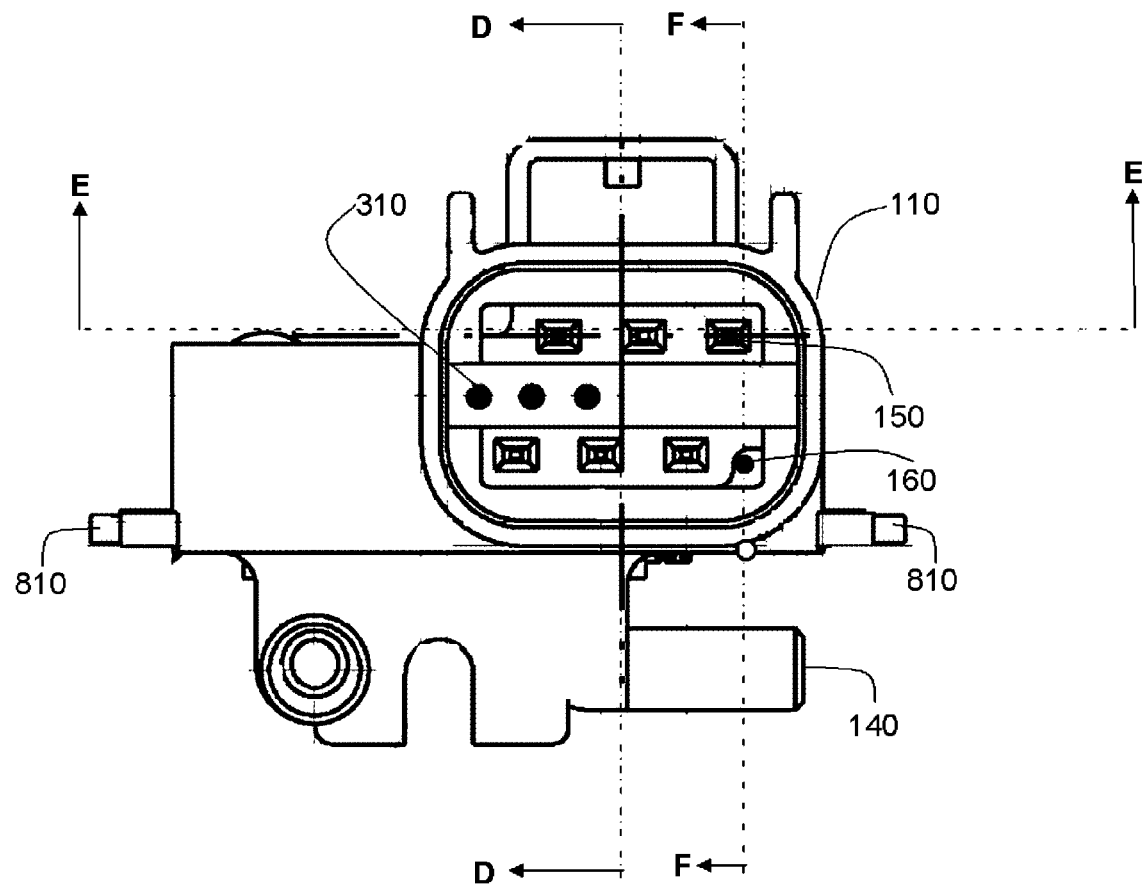
FIG. 8 illustrates a detailed perspective view of a housing assembly of a molded connector for creating a sealed cavity, in accordance with a preferred embodiment.

Referring to FIG. 8, a detailed perspective view of a housing assembly 100 incorporating molded connector 110 for creating a sealed cavity is illustrated, in accordance with a preferred embodiment. As depicted in FIG. 8, the vent hole 160 is located adjacent to the terminals 150. The vent hole 160 is placed near the deepest point within the confines of the molded connector 110 and emerges near the closest terminal 150 to the wall of the interior. This prevents the need to seal the vent hole with additional processes. Locking tabs 810 fasten the completed sensor in the final application.

Figure 8A:
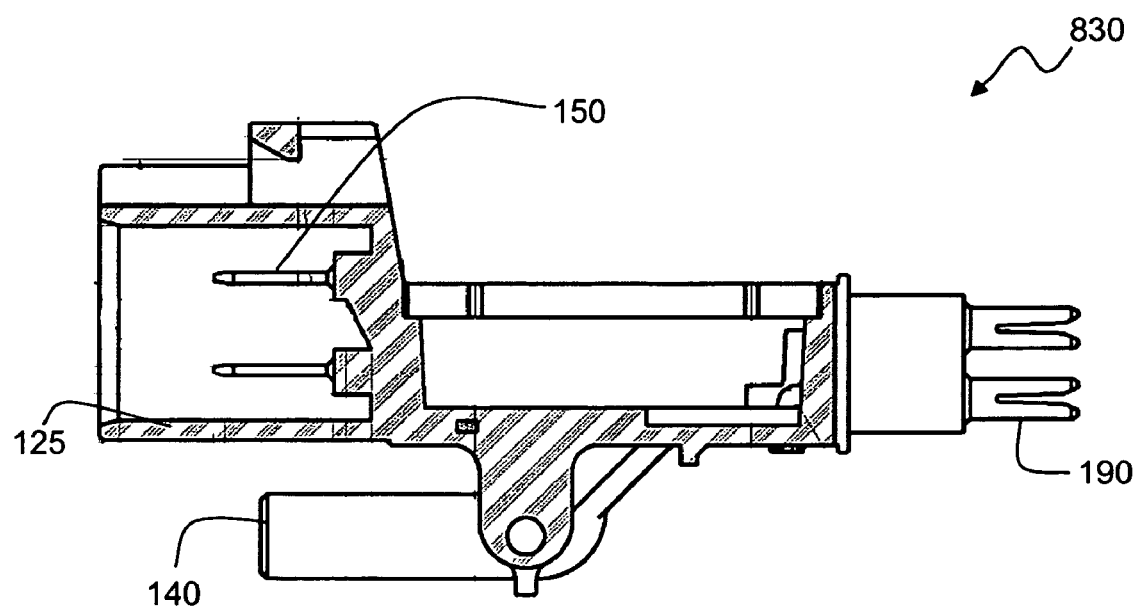
FIG. 8A illustrates a sectional view D-D of the molded connector depicted in FIG. 8 for creating a sealed cavity, in accordance with a preferred embodiment.

Referring to FIG. 8A, a sectional view D-D of a housing assembly 830 for creating a sealed cavity is illustrated, in accordance with a preferred embodiment. Again, as indicated earlier, identical parts of elements depicted in FIGS. 1-10 are generally indicated by identical reference numerals. Thus, the FIG. 8A illustration also depicts the sealing surface 125, pressure port 140, terminals 150, and power plug 190 which are described above with respect to FIG. 1.

Figure 8B:
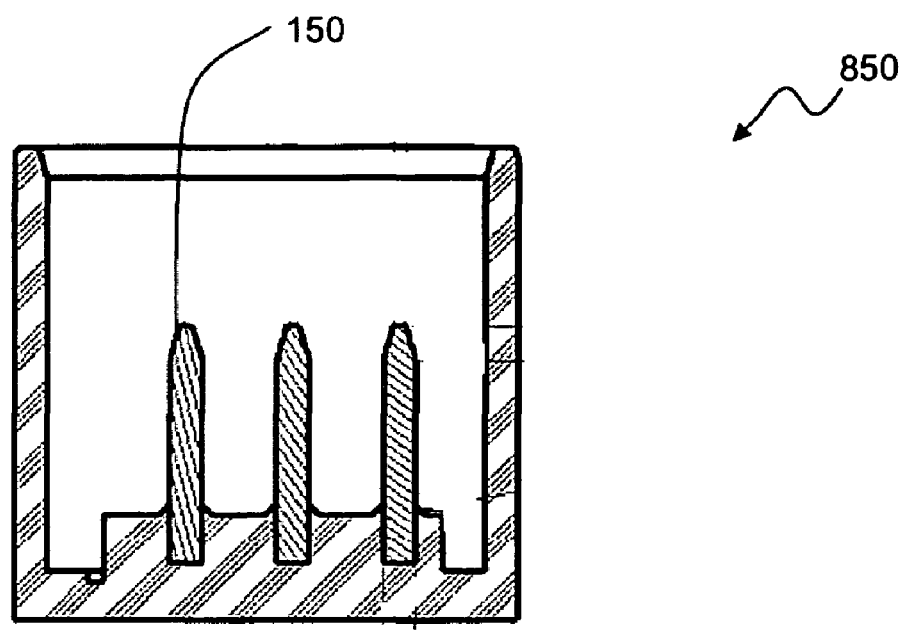
FIG. 8B illustrates a sectional view E-E of the molded connector depicted in FIG. 8 for creating a sealed cavity, in accordance with a preferred embodiment.

Referring to FIG. 8B, a sectional view E-E of a molded connector 850 depicted in FIG. 8 for creating a sealed cavity is illustrated, in accordance with a preferred embodiment. The terminals 150 are used to provide electrical interconnections to the outside world.

Figure 8C:
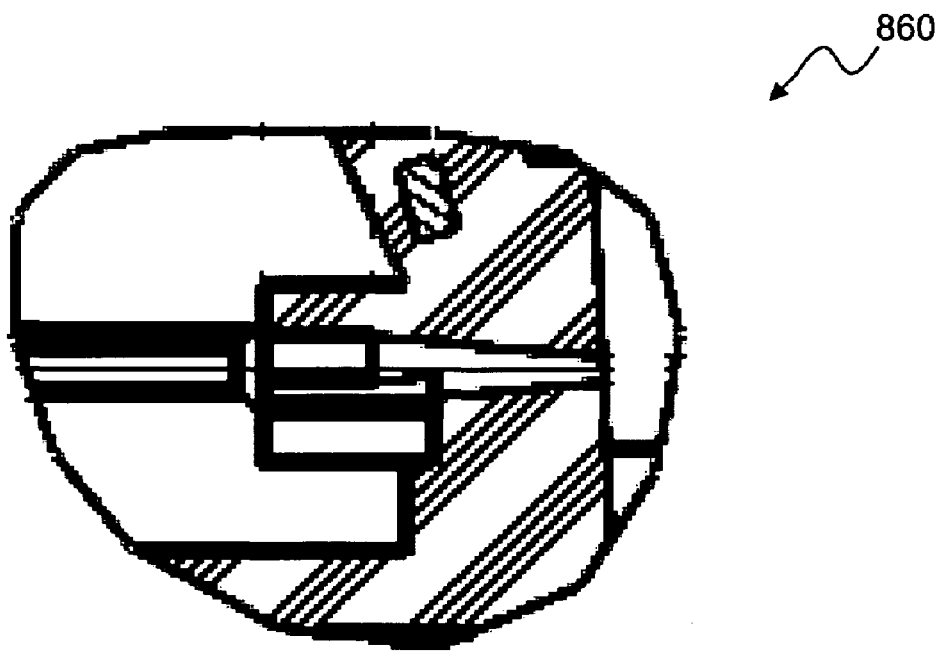
FIG. 8C illustrates a sectional view F-F of the molded connector depicted in FIG. 8 for creating a sealed cavity, in accordance with a preferred embodiment.

Referring to FIG. 8C a sectional view F-F of the molded connector 860 depicted in FIG. 8 for creating a sealed cavity is illustrated, in accordance with a preferred embodiment. FIG. 8C illustration clearly shows the vent hole 160.

Figure 9:
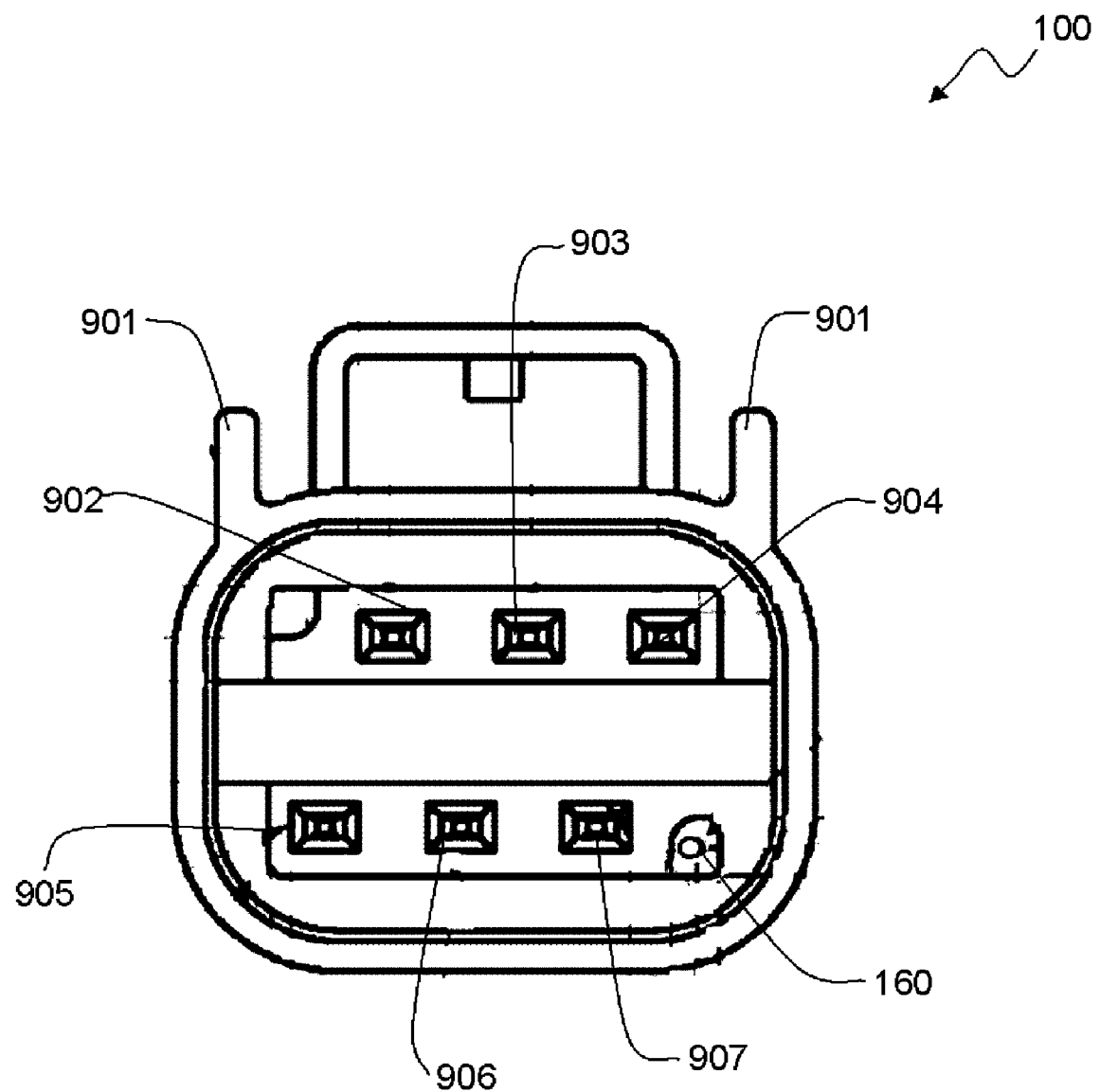
FIG. 9 illustrates a detailed perspective view of a housing assembly incorporating a molded connector for creating a sealed cavity, in accordance with a preferred embodiment.

Referring to FIG. 9, a detailed perspective view showing a portion of the housing assembly 100 incorporating a molded connector for creating a sealed cavity is illustrated, in accordance with a preferred embodiment. A hermetic terminal assembly can be provided having conductor pins 902-907 that are rigidly and hermetically secured to the body portion entirely by a resilient plastic that possesses the requisite materials properties, such as dielectric, moisture resistance, and resistance to chemical breakdown, to provide for a water-tight seal. In addition to providing a water-tight seal between the conductor pins 902-907 and the housing 100, the same resilient plastic can be bonded to the conductor pins 902-907 to provide a desired air path between the pins and the face of the body portion. The following Table 1 includes terminal number and its part name.

TABLE 1

| NUM | PART NAME |
| --- | --- |
| 901 | ALIGNMENT TABS |
| 902 | TERMINAL-TIN, EVR(−) |
| 903 | TERMINAL-GOLD, $V_{SUPP}$ |
| 904 | TERMINAL-GOLD, $V_{OUT}$ MAP |
| 905 | TERMINAL-TIN, EVR(+) |
| 906 | TERMINAL-GOLD, $V_{OUT}$ DPFE |
| 907 | TERMINAL-GOLD, GND |

Figure 10:
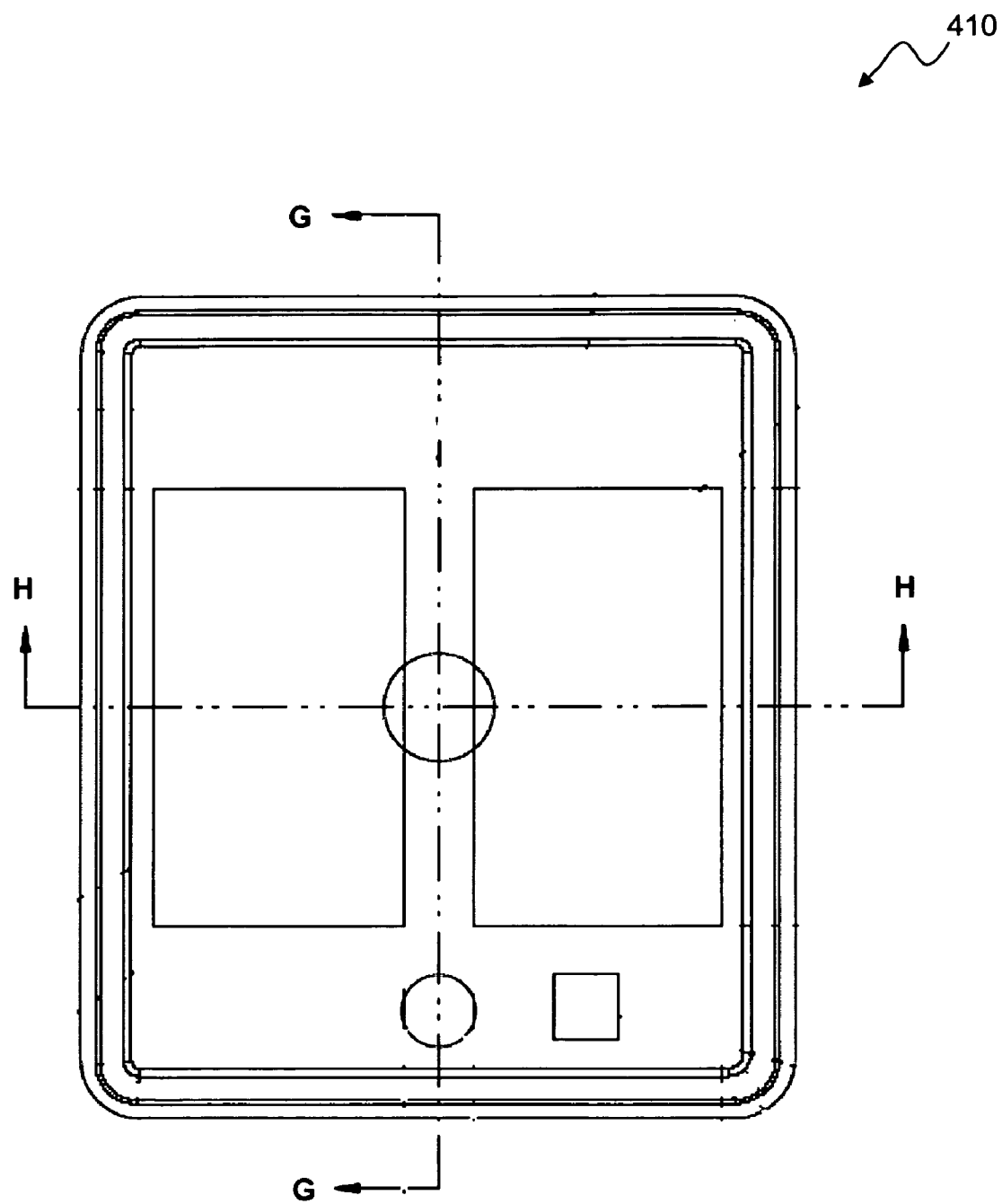
FIG. 10 illustrates a detailed perspective view of a lid without vent hole to be attached to a housing assembly, in accordance with a preferred embodiment.

Referring to FIG. 10 a detailed perspective view of a lid 410 without a vent hole is illustrated, in accordance with a preferred embodiment.

Referring to FIG. 10 a detailed perspective view of a lid 410 without a Vent hole is illustrated, in accordance with a preferred embodiment.

Figure 10A:
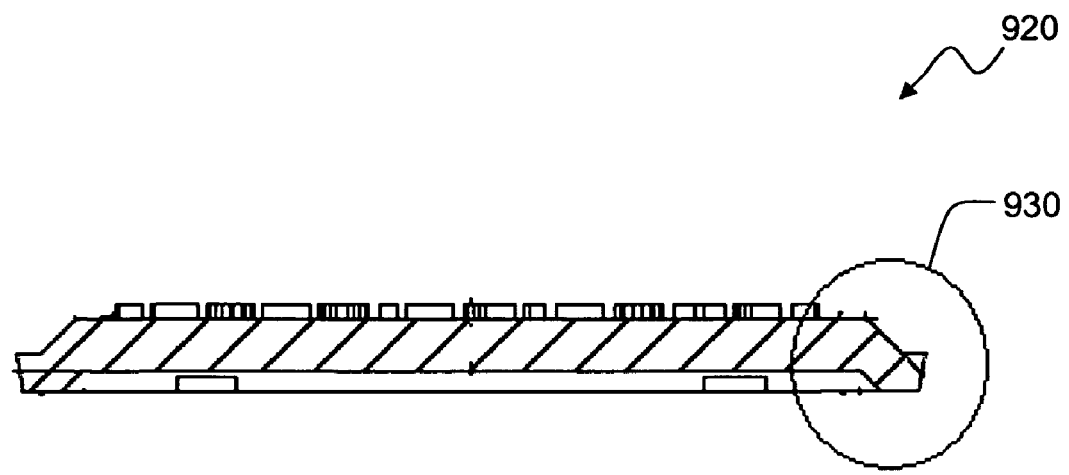
FIG. 10A illustrates a sectional view G-G of the lid depicted in FIG. 10, in accordance with a preferred embodiment.

Referring to FIG. 10A a sectional view G-G of the lid 410 depicted in FIG. 10 is Illistrated, in accordance with a preferred embodiment.

Figure 10B:
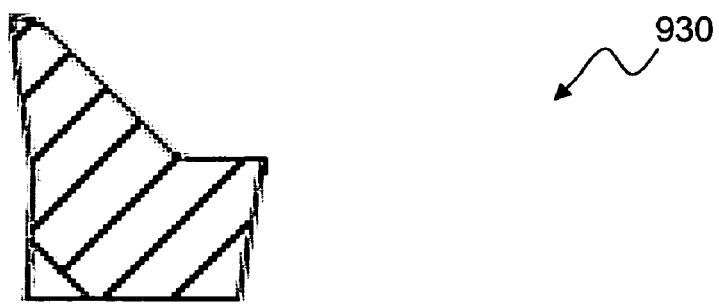
FIG. 10B illustrates an exploded perspective view of a curved portion of FIG. 10A of the lid, in accordance with a preferred embodiment.

Referring to FIG. 10B an exploded perspective view of a curved portion 930 of FIG. 10A of the lid 410 is illustrated, in accordance with a preferred embodiment.

Figure 10C:
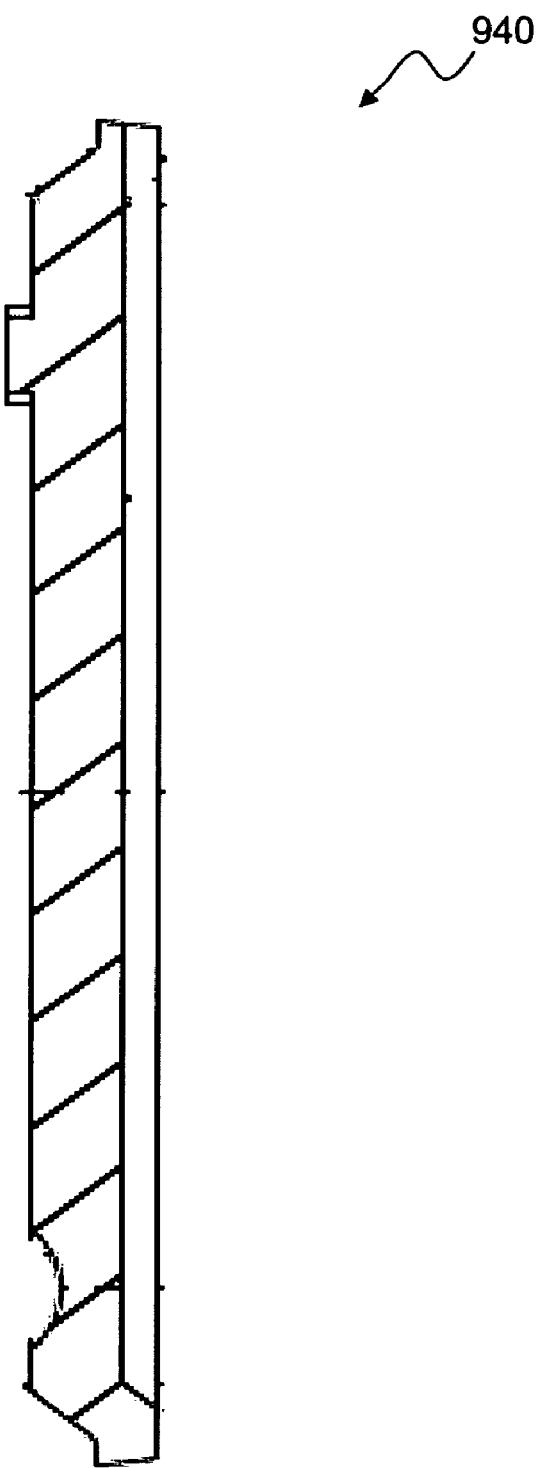
FIG. 10C illustrates a sectional view H-H of the lid depicted in FIG. 10, in accordance with a preferred embodiment.

Referring to FIG. 10C a sectional view H-H of the lid 410 depicted in FIG. 10 is illustrated, in accordance with a preferred embodiment.

Figure 11:
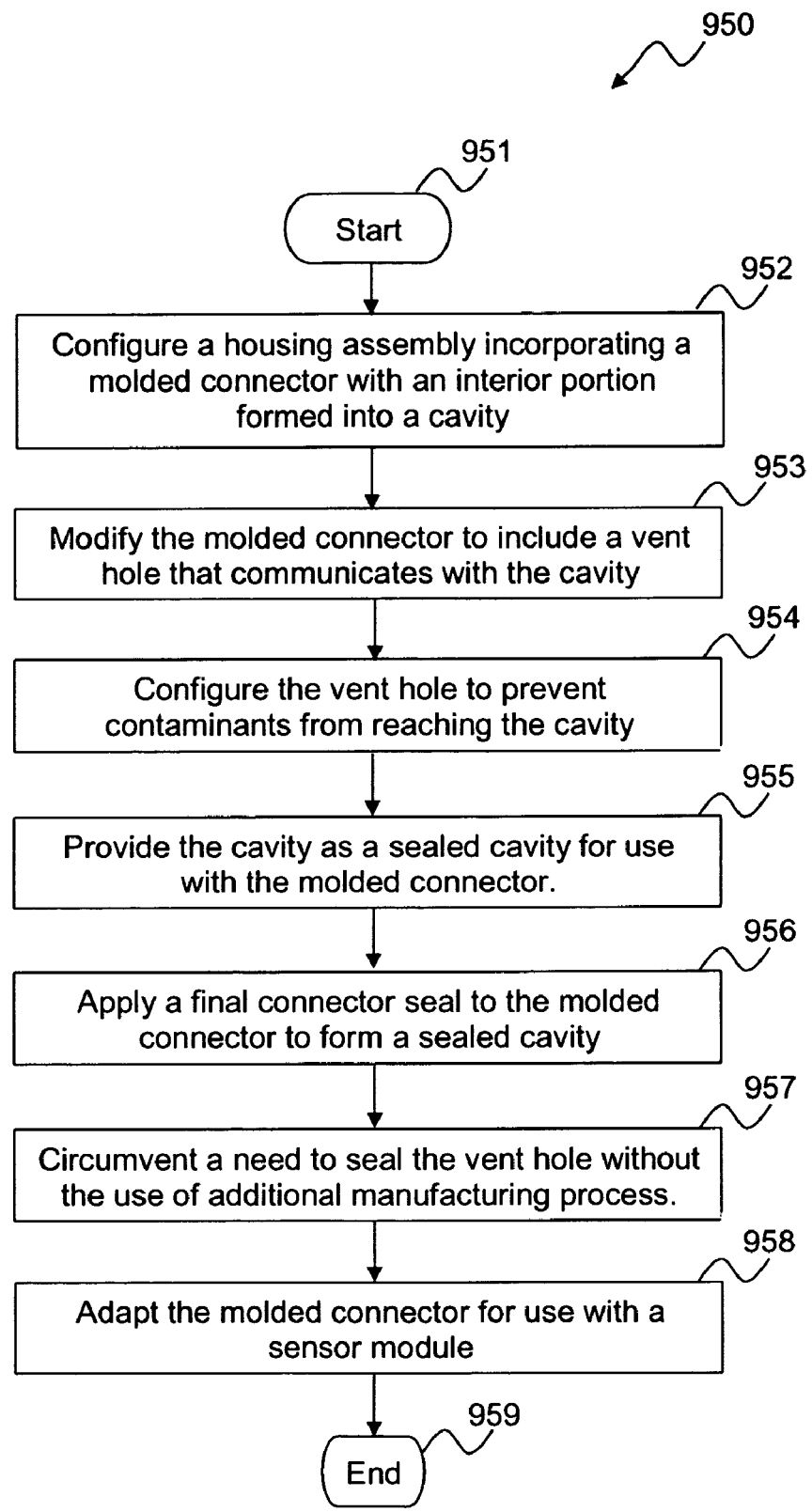
FIG. 11 illustrates a high level flow chart of operations depicting logical operational steps for creating a sealed cavity, in accordance with an alternative embodiment.

Referring to FIG. 11, a high level flow chart 950 of operations depicting logical operational steps for creating the sealed cavity 170 is illustrated, in accordance with an alternative embodiment. The process depicted in FIG. 11 can be initiated, as indicated at block 951. Thereafter, as depicted at block 952, a housing assembly 100 incorporating a molded connector 110 with an interior portion formed into a cavity 170 can be configured. The molded connector 110 can then be modified to include the vent hole 160, which communicates with the cavity 170, as depicted at block 953. Next, as depicted at block 954, the vent hole 160 can be configured to prevent contaminants from reaching the cavity 170. Thereafter, as indicated at block 955, the cavity 170 can be provided as a sealed cavity for use with the molded connector 110. Similarly, a final connector seal can be applied to the molded connector 110 to form a sealed cavity 170, as shown at block 956. Next, a need to seal the vent hole 160 without the use of additional manufacturing process can be circumvented, as depicted at block 957. The molded connector 110 can then be adapted for use with a sensor module, as illustrated at block 958. The process can then terminate, as indicated at block 959.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for creating a sealed cavity, comprising:
configuring a housing assembly incorporating a molded connector having an interior portion formed into a cavity;
modifying said molded connector to include a vent hole within said molded connector that communicates with said cavity;
allowing an expanding gas to escape through said vent hole while a liquid seal solidifies;
controlling dimensions of said vent hole to vary ambient conditions at which said vent hole allows pressure in said cavity to be vented;
configuring said vent hole such that said vent hole prevents contaminants from reaching said cavity in order to provide said cavity as a sealed cavity for use with said molded connector; and
hermetically sealing said vent hole to provide an airtight and watertight cavity.

2. The method of claim 1, further comprising:
applying a final mating connector seal to said molded connector in order to form said sealed cavity, thereby circumventing a need to seal said vent hole without the use of additional manufacturing process steps.

3. The method of claim 1 further comprising:
adapting said molded connector for use with a sensor module.

4. The method of claim 1 further comprising:
providing said housing assembly to maintain said molded connector and said sealed cavity.

5. The method of claim 4 further comprising:
providing a hermetic terminal assembly having conductor pins; and
rigidly and hermetically securing said conductor pins to said housing assembly.

6. The method of claim 5 wherein said housing assembly is formed from a resilient plastic.

7. The method of claim 1 further comprising:
applying a final mating connector seal to said molded connector in order to form said sealed cavity, thereby circumventing a need to seal said vent hole without the use of additional manufacturing process steps; and
adapting said molded connector for use with a sensor module.

8. The method of claim 4 further comprising:
applying a final mating connector seal to said molded connector in order to form said sealed cavity, thereby circumventing a need to seal said vent hole without the use of additional manufacturing process steps.

9. The method of claim 4 further comprising:
providing a hermetic terminal assembly having conductor pins; and
rigidly and hermetically securing said conductor pins to said housing assembly, wherein said housing assembly is formed from a resilient plastic.

10. The method of claim 1 wherein said sealed cavity is adapted for use with a gas sensor module.

11. A method for creating a sealed cavity, comprising:
configuring a housing assembly incorporating a molded connector having an interior portion formed into a cavity;
modifying said molded connector to include a vent hole within said molded connector that communicates with said cavity;
allowing an expanding gas to escape through said vent hole while a liquid seal solidifies;

controlling dimensions of said vent hole to vary ambient conditions at which said vent hole allows pressure in said cavity to be vented;

configuring said vent hole such that said vent hole prevents contaminants from reaching said cavity in order to provide said cavity as a sealed cavity for use with said molded connector;

applying a final mating connector seal to said molded connector in order to form said sealed cavity, thereby circumventing a need to seal said vent hole with the use of additional manufacturing process steps, wherein said sealed cavity is adapted for use with a gas sensor module; and hermetically sealing said vent hole to provide an airtight and watertight cavity.

12. An apparatus for providing a sealed cavity by use of a liquid seal to be solidified, comprising:

a housing assembly incorporating a molded connector configured to include an interior portion formed into a cavity, wherein said molded connector comprises a vent hole within said molded connector that communicates with said cavity;

wherein an expanding gas is allowed to escape through said vent hole while the liquid seal solidifies;

wherein dimensions of said vent hole is controlled to vary ambient conditions at which said vent hole allows pressure in said cavity to be vented;

wherein said vent hole is configured such that said vent hole prevents contaminants from reaching said cavity in order to provide said cavity as a sealed cavity for use with said molded connector; and wherein said sealed cavity is hermetically secured to provide an airtight and watertight cavity.

13. The apparatus of claim 12 further comprising:

a final mating connector seal applied to said molded connector in order to form said sealed cavity, thereby circumventing a need to seal said vent hole without the use of additional manufacturing process steps.

14. The apparatus of claim 12 further comprising wherein said molded connector is adapted for use with a sensor module.

15. The apparatus of claim 12 further comprising:

a housing assembly for maintaining said molded connector and said sealed cavity.

16. The apparatus of claim 15 further comprising:

a hermetic terminal assembly having conductor pins, wherein said hermetic terminal assembly is rigidly and hermetically secured by said conductor pins to said housing assembly.

17. The apparatus of claim 16 wherein said housing assembly is formed from a resilient plastic.

18. The apparatus of claim 12 further comprising a final mating connector seal applied to said molded connector in order to form said sealed cavity, thereby circumventing a need to seal said vent hole without the use of additional manufacturing process steps, wherein said molded connector is adapted for use with a sensor module.

19. The apparatus of claim 12 further comprising said housing assembly to maintain said molded connector and said sealed cavity, wherein said housing assembly is formed from a resilient plastic.

20. The apparatus of claim 12 further comprising a hermetic terminal assembly having conductor pins, wherein said hermetic terminal assembly is rigidly and hermetically secured by said conductor pins to said housing assembly, wherein said housing assembly is formed from a resilient plastic.

* * * * *